United States Patent Office 2,824,891
Patented Feb. 25, 1958

2,824,891

SURFACE ACTIVE AGENTS DERIVED FROM AROMATIC ALDEHYDE INTERMEDIATES

Ernest L. Pollitzer, La Grange, Ill., assignor to Universal Oil Products Company, Des Plaines, Ill., a corporation of Delaware No Drawing. Application November 7, 1955
Serial No. 545,518

12 Claims. (Cl. 260—505)

This invention relates to novel compositions of matter possessing surface active properties and to the process for their manufacture. More specifically, the invention concerns alkylaryl-substituted alkyl sulfonates formed by a particular reaction mechanism involving an alkyl aromatic aldehyde as an intermediate reactant, an aldol condensation of the aldehyde with a nitro compound and finally, condensation of the resulting product with an inorganic bisulfite to form the present sulfonates, in accordance with procedures hereinafter more fully described.

One object of this invention is to provide a process for the manufacture of a novel class of sulfonated compounds wherein the sulfonate radical occupies a position on an alkyl side chain attached to the aromatic nucleus of an alkyl aromatic hydrocarbon. Another object of this invention is to produce surface active agents, particularly detergents, which are soluble in water. Still another object of the invention is to provide a class of detergents characterized as substituted alkylaryl-alkyl sulfonates, the surface active properties of which may be varied to correspond to optimum surface activity for a particular application by the introduction into the structure of the compounds of suitable substituents such as alkyl groups, as well as others.

One embodiment of the invention relates to a process for the production of a surface active agent which comprises reacting a formylating agent with an alkyl aromatic hydrocarbon containing a nuclear hydrogen atom capable of substitution, an aryl nucleus selected from the mono- and bicyclic aromatic radicals and not more than 1 alkyl side chain per molecule containing from 5 to about 18 carbon atoms, effecting the reaction at conditions resulting in the replacement of said hydrogen atom with a formyl radical, condensing the resulting aromatic aldehyde with nitro-alkane containing from 1 to 5 carbon atoms to form a beta-nitroalkenyl-alkyl aromatic hydrocarbon intermediate and thereafter condensing said intermediate with an inorganic bisulfite to introduce a sulfonate radical into the nitro-vinyl substituent on the aryl nucleus.

A more specific embodiment of the invention relates to a compound having the structure:

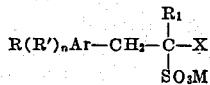

wherein Ar is an aromatic hydrocarbon group selected from the mono- and dinuclear radicals, R is an alkyl group containing from 5 to about 9 carbon atoms when Ar is bicyclic and from about 8 to about 18 carbon atoms when Ar is monocyclic, R' is an alkyl group containing from 1 to 3 carbon atoms, R₁ is a radical selected from the group consisting of hydrogen and alkyl containing from 1 to 4 carbon atoms, n is a whole number having a value from 0 to 2, X is a radical selected from the group consisting of nitro, amino and mono-alkylamino containing from 1 to 6 carbon atoms per alkylamino group and M is an electropositive group selected from the alkali metal, alkaline earth metal, ammonium and alkyl ammonium ions.

The products of this invention are formed by the following general procedure, wherein an alkyl aromatic aldehyde is condensed with a nitroalkane, preferably nitromethane, to form an alkylaryl substituted nitroethylene as an intermediate which is thereafter condensed with an inorganic bisulfite to form the corresponding alkylaryl nitroalkyl sulfonate as a product of the reaction or as an intermediate in the production of a reduced nitro derivative having the structure of an amine sulfonate. The starting material in this series of reactions is an alkyl aromatic aldehyde which may be derived by any suitable method of synthesis but is preferably formed by a method of synthesis which involves adding a formyl radical to the nucleus of an alkyl aromatic hydrocarbon having a replaceable hydrogen atom. The initial starting material is thus an alkyl aromatic hydrocarbon, usually prepared by synthetic means, although also available from many naturally occurring sources, such as specific boiling range fractions of crude petroleum or its conversion products, said hydrocarbon being of either mono- or dinuclear structure, that is, either a benzene or naphthalene hydrocarbon having a long chain alkyl substituent, which in the case of the naphthalene derivatives, contains at least 5, up to about 9 carbon atoms per group and in the case of the benzene hydrocarbons is an alkyl group containing at least 8, up to about 18 carbon atoms per alkyl group. Additional short chain alkyl groups may be present on the aromatic nucleus, generally and preferably, not more than 2 in number, which may be methyl, ethyl, or propyl radicals, leaving at least one replaceable nuclear hydrogen atom on the aryl nucleus, subject to replacement by a formyl group. Specific alkyl aromatic hydrocarbon starting materials are preferably formed in a preliminary stage of the process by alkylating an aromatic hydrocarbon with an olefinic alkylating agent corresponding in chain length to the desired long chain alkyl group, in the presence of an acidic alkylation catalyst such as sulfuric acid, substantially anhydrous hydrofluoric acid, an aluminum halide, etc. including such aromatic compounds as nonylbenzene, nonyltoluene, decylbenzene, decyltoluene, decylxylene, dodecylbenzene, dodecyltoluene, pentadecylbenzene, pentadecyltoluene, octadecylbenzene, octadecyltoluene, amyldimethylnaphthalene, hexylnaphthalene, octylnaphthalene, octylmethylnaphthalene, diamylnaphthalene, and other homologs within the limits expressed above.

In accordance with the process of the present invention, a formyl radical is introduced on the aromatic nucleus by means of a condensation type of reaction to form an intermediate capable of reacting with a nitroalkane in an intermediate stage of the present process. A convenient method of introducing a formyl radical on the aromatic nucleus comprises reacting the alkylaryl hydrocarbon starting material with a mixture of carbon monoxide and a hydrogen halide at reaction conditions suitable to effect the condensation with one of the nuclear hydrogen atoms. This reaction is preferably effected at a superatmospheric pressure, generally not in excess of about 1000 atmospheres, since pressure usually favors the reaction. The condensation is effected in the presence of a Friedel-Crafts metal halide-type catalyst, such as a zinc halide, aluminum halide, ferric halide and others, one of the preferred being anhydrous aluminum chloride, particularly the halide corresponding to the hydrogen halide utilized in the reaction. The above type of formylation reaction generally results in the introduction of a formyl group in a position on the aryl nucleus para to the long chain alkyl group, when the starting material is an alkylbenzene hydrocarbon.

The aromatic aldehyde prepared as indicated above is converted to a nitroalcohol by condensing the previously formed aldehyde with a nitroalkane in an aldol-type condensation reaction, preferably in the presence of an alkaline material which catalyzes the condensation reaction. The product formed as a result of the aldol condensation between a nitroalkane and the previously formed aldehyde is a nitro-alcohol having the structure of a beta-nitrohydroxyethyl-substituted aromatic hydrocarbon containing an hydroxyl group on the carbon atom formerly constituting the formyl radical of the aldehyde and a nitro group on the alpha-carbon atom of the nitroalkane condensed therewith, in accordance with the following equation:

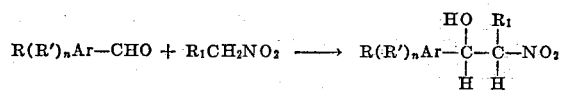

The condensation is preferably carried out in a sealed reactor which may be stirred or otherwise agitated in order to mix the normally insoluble phases when an aqueous alkali solution which is utilized as a condensation catalyst. The reaction proceeds readily at temperatures of from about 50° to about 150° C., although in the upper portions of the latter range the intermediate alcohol formed as a result of the condensation reaction undergoes dehydration to yield the desired nitro-substituted alkenyl radical as the end product of the aldol-type condensation. Nitromethane is commonly utilized as the nitroalkane reactant, although with the proper choice of reaction conditions, usually at higher temperatures and higher pressures, higher molecular weight nitroalkanes containing up to about 5 carbon atoms per molecule, such as nitroethane, 1-nitropropane, 2-nitropropane and the nitrobutanes may also be utilized in the condensation reaction to form the corresponding homologous nitro-alcohol derivatives. A molar excess of the nitroalkane reactant is preferably utilized in the reaction in order to increase the yield of nitroalcohol product from a given charge of the alkyl aromatic aldehyde reactant.

The nitroalcohol normally formed as the product of the aldol condensation of the aldehyde with nitromethane readily undergoes dehydration to form the corresponding nitroalkenyl derivative of the alkyl aromatic hydrocarbon. Thus, as indicated above, when the aldol condensation reaction is run at a relatively high temperature the desired nitroalkenyl derivative may be formed directly as the primary product of the reaction by a combined condensation-dehydration reaction, rather than an intermediate nitroalcohol. When the aldol condensation is effected at lower reaction temperatures, the nitroalcohol product may be subsequently heated, for example during the distillation of the crude product, to form the nitroalkenyl-substituted alkyl aromatic hydrocarbon product desired for use in the subsequent stages of the proces. These reactions may be represented by the following equation:

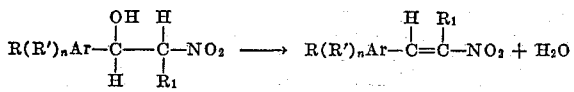

which ordinarily occurs during the aldol condensation reaction without the intermediate isolation of the nitroalcohol formed as the result of the condensation reaction, the loss of water from the nitroalcohol being the result of activation of the methylene (—CH$_2$—) hydrogen atoms and the hydroxyl group by the nitro group and the aromatic ring, respectively. In general, dehydration of the nitroalcohol occurs at temperatures of from about 120° to about 200° C. and since the intermediate nitroalcohol when separated from the aldol condensation reaction boils at a temperature generally above the latter range, distillation of the nitroalcohol intermediate product of the aldol condensation reaction in any event effects dehydration thereof to the nitroalkenyl-cyclic hydrocarbon-substituted alkane. The distillation is preferably effected at a subatmospheric pressure in order to reduce the boiling point and eliminate the tendency of the product to undergo cracking and other decomposition reactions at higher distillation temperatures.

The nitroalkenyl-cyclic hydrocarbon substituted alkane formed as a result of the condensation of the nitroalkane with the alkyl-substituted aromatic aldehyde, followed by the dehydration of the intermediate alcohol is capable of undergoing an addition-condensation reaction with alkaline bi-sulfite salts at the olefinic linkage between the carbon atoms alpha and beta, respectively, to the nitro group and thereby form sulfonate derivatives which comprises one species of the products of this invention or an intermediate which may be further reacted with suitable reagents to modify the properties of the resultant surface active compound. This stage of the present process may be represented for sodium bisulfite as the alkaline sulfite salt by the following equation:

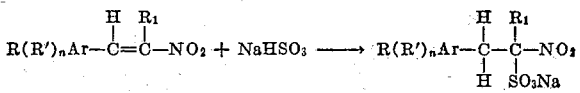

wherein R, R', R$_1$, n, and Ar correspond to radicals hereinbefore defined.

Suitable alkaline bisulfite compounds utilizable in the above condensation reaction include the alkali metal bisulfites, such as sodium bisulfite, potassium bisulfite, and lithium bisulfite, and ammonium bisulfite. The condensation of the alkaline bisulfite with the nitroalkenyl-cyclic hydrocarbon-substituted alkane occurs at relatively mild reaction conditions, generally at temperatures of from about 50° to about 100° C. in aqueous solution and it is generally preferable to employ an excess of the alkali bisulfite reactant in order to insure substantially complete conversion to the sulfonate derivative, the excess alkaline bisulfite being separated, if desired, from the reaction mixture following completion of the reaction by extracting the organic product from the reaction mixture with a suitable organic solvent such as methanol, ethanol, acetone or other solvent in which the hydrocarbon nitrosulfonate is soluble. The product of the reaction is generally a salt-like material which is readily soluble in water and which has surface active properties, including detergency, when the size of the hydrophobic hydrocarbon groups are appropriately selected in the various reaction stages to produce a water-soluble material when combined with the hydrophilic sulfonate radical during the last-mentioned condensation reaction.

Although the product as formed in the preceding condensation reactions, containing a hydrophilic sulfonate radical attached to the nitroalkylene-cyclic hydrocarbon-substituted alkane possesses the required degree of surface activity to impart substantial detergent qualities to the product of the above condensation reactions, the sulfonate product may be considered as an intermediate in the further conversion thereof to derivatives having greater water-solubility and surface activity, the latter products comprising other species of the present invention. Thus, the nitro radical substituted on the alkyl side chain of the cyclic hydrocarbon nucleus which also bears the sulfonate radical may be reduced by hydrogenation and the amino group formed thereby either retained in the structure of the product or converted to various derivative groups which increase or decrease the hydrophilic portion of the molecule, as hereinafter described.

The reduction of the nitro radical of the preceding condensation reaction product is readily effected by hydrogenation, a procedure well-known in the art. A convenient method of effecting such reduction comprises dissolving the nitro-substituted sulfonate in a suitable solvent therefore, such as ethyl alcohol and charging the resulting solution into a pressure autoclave, together with a hydrogenation catalyst, such as an alumina supported nickel composite, a platinum or palladium catalyst supported on a suitable solid material such as alumina or kieselguhr, or other recognized hydrogenation catalyst and subjecting the resulting mixture to hydrogen pressures of from 1 to about 100 atmospheres, at temperatures of from about 50° to about 150° C., while the contents of the autoclave are stirred to expose the charging stock and catalyst to the hydrogen atmosphere. Hydrogenation under the above conditions generally results in a quantitative conversion of the nitro-substituted sulfonate to the corresponding amino-substituted sulfonate which may be separated from the reaction mixture by extraction with water, or other suitable solvent. The reduction may also be effected at conditions which result in partial or complete saturation of the aromatic nucleus, thereby converting the product to a naphthene derivative, contemplated within the scope of the term "cyclic hydrocarbon group," herein specified.

In the event that the amino-substituted sulfonate, prepared as indicated by the above hydrogenation procedure, is to be converted into a product more highly soluble in such organic solvents as hydrocarbons, alcohols, ethers, etc., the amino group of the above previously formed product may be alkylated with a ketone, an aldehyde, an alkyl halide, an aryl halide or other alkylating agent condensable with the amino group to form the corresponding secondary and/or tertiary amines resulting from the substitution of 1 or 2 alkyl or aryl radicals, respectively, on the amino group. One of the preferred methods for effecting the later amino-alkylation reaction comprises condensing the aminosulfonate with an alkyl halide containing from 1 to about 5 carbon atoms, such as methylchloride, methylbromide, methyliodide, ethylchloride, ethylbromide, ethyliodide or other alkyl halide having from 1 to 5 carbon atoms, for example by heating the aminosulfonate intermediate with the alkyl halide at temperatures of from about 70° to about 200° C. and thereafter converting the resulting alkyl ammonium halide product to the alkyl amine by contacting the product with an aqueous alkaline solution, such as a 20% caustic soda solution. If a product more highly soluble in water is desired as the ultimate product of the present invention, the alkyl ammonium halide resulting from the condensation of the alkyl halide with the amino sulfonate salt may be separated from the reaction mixture and utilized directly as the final product, the compound resulting thereby containing the hydrophilic alkyl ammonium halide substituent which increases the solubility of the product as a whole in water. Alternatively, the alkyl ammonium halide product may be converted to an ammonium salt of a different mineral acid, such as the sulfate, nitrate or carbonate, thereby providing a product which is more highly soluble in water, by reacting the intermediate alkyl ammonium halide with the appropriate mineral acid, such as sulfuric acid, nitric acid, carbonic acid, etc.

Still another type of conversion reaction to which the above amino sulfonate intermediate product may be subjected in order to increase the solubility of the resulting product in water and increase the hydrophilic properties of the side chain attached to the cyclic hydrocarbon nucleus comprises condensing the amino sulfonate with a compound bearing multiple hydrophilic groups or with an alkylene oxide, alkylene imine or other reactant which yields hydrophilic groups. Thus, the amino sulfonate may be condensed with an alkylene oxide selected from ethylene oxide and propylene oxide (preferably, ethylene oxide or an alpha-halohydroxy) to introduce a poly-(oxyalkylene) chain into the compound by direct attachment to the amino group, in accordance with the following equation:

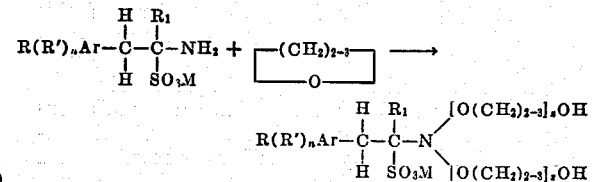

wherein $z$ represents the number of oxyalkylene units entering into the condensation reaction or with glycidol to form hydrophilic chains on the amino nitrogen atom of the following structure:

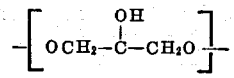

to replace one or both of the amino hydrogen atoms. In most instances, from 1, up to about 10 glycidol units are sufficient to form hydrophilic chains of the required water-solubilizing properties to form surface active agents. The condensation of the amine with an alkylene oxide may be effected at temperatures of from 40° to about 110° C. under generally anhydrous conditions and usually in the presence of a basic condensation catalyst such as powdered sodium hydroxide, sodium methylate, sodium ethylate, pyridine or other basic catalyst which promotes the condensation reaction. The hydrophilic property of the resulting poly-(oxyalkylene) chain is dependent upon the number of moles of alkylene oxide charged to the condensation reaction per mole of amino sulfonate, and generally the preferred products contain a total of from 5 to about 20 oxyalkylene units per mole, although longer poly-(oxyalkylene) chains may be desired for certain purposes, containing, for example, up to about 50 oxyalkylene units. Another class of reagents suitable for introducing an ω-hydroxy-oxyalkylene or a poly-(oxyalkylene) chain on the amino group are the alpha-chloro- or alphabromohydrin derivatives of an ethylene or propylene glycol or a polyalkylene glycol containing from 2 to about 10 oxyalgylene units per molecule. These halohydrins condense through the halogen atom of the halohydrin with the amino group of the amino sulfonate, the reaction also being promoted by the above-indicated alkaline condensation catalysts. In order to introduce a simple oxyalkylene unit on the amino group, the intermediate aminosulfonate may be reacted with an ethylene halohydrin (alpha-halo-omega-hydroxyethane) or with propylene halohydrin (alpha-halo-omega-hydroxypropane or alpha-halo-beta-hydroxypropane) usually in the presence of an alkaline condensing agent which promotes the condensation. A more hydrophilic group may be introduced into the compound by condensing the amino group with an alpha-halo-substituted derivative of a polyalkylene glycol, which may be illustrated by the following formula for a chlorohydrin derivative of a polyalkylene glycol containing from 2 to 3 carbon atoms per alkylene group, wherein $n$ is a whole number having a value of from 1 to about 9:

these halohydrins also being known as the alpha-halo-omega-hydroxy-poly-(oxyalkylene)-alkanes. The product of the reaction is generally a tertiary amine containing two poly-(oxyalkylene) chains per molecule, formed by the condensation of the halohydrin derivative of the poly-(oxyalkylene) glycol with each of the amino hydrogen atoms. The terminal hydroxyl group at the end of the poly-(oxyalkylene) chain may be further reacted with an esterifying agent, such as sulfuric acid, to form the sulfate ester of such hydroxyl group, the product generally being more highly water-soluble than the compound containing the free hydroxyl group.

Other hydroxyl-substituted compounds may also be condensed with the terminal amino group of the amino sulfonate intermediate to introduce other hydrophilic groups into the structure of the compound, such as a carbohydrate, including such typical members of this group as glucose, sucrose, fructose etc. inositol, pentaerythritol, polyhydric phenols such as resorcinol and others.

The latter products containing hydrophilic poly-(oxyalkylene) groups or other hydrophilic compounds containing multiple hydroxyl radicals are generally of waxlike characteristics having mucilaginous properties when lathered with water and thus have many of the characteristics of soap.

The present invention in several of its specific embodiments may be further illustrated in the following examples which illustrate various aspects of the invention, but are not intended to restrict the generally broad scope of the invention necessarily in accordance therewith.

EXAMPLE I

A product having detergent qualities is prepared in accordance with the following series of reaction steps, the product being a salt-like material, soluble in water at all concentrations usually employed for laundering purposes.

Two alkylbenzene hydrocarbons were prepared in a preliminary process by alkylating benzene in one reaction and toluene in another reaction with the 170–225° C. fraction of a propylene polymer product (containing $C_9$, $C_{12}$ and $C_{15}$ olefins), utilizing an aromatic to olefin molar ratio of 10, at temperature of 30–40° C. and a 98.5% sulfuric acid catalyst in a ratio of catalyst to total mixed hydrocarbon feed of 0.2. The alkylate fractions were separated from the total hydrocarbon product by distillation at 10 mm. Hg pressure, the toluene alkylate having a boiling range at 760 mm. of 275–345° C., while the benzene alkylate boiled from 270 to 325° C. at 760 mm. pressures.

The above alkylates are converted to their corresponding aldehyde derivatives by reacting the hydrocarbons with a mixture of carbon monoxide and dry hydrogen chloride gases at a temperature of from 30 to 40° C., in the presence of anhydrous aluminum chloride catalyst (1 lb./100 lbs. of alkylate) and at a pressure of 10,000 p. s. i. gage, the aldehydes being separated from the unreacted hydrocarbons by distillation at 3 mm. pressure. The aldehyde products in each instance readily undergo oxidation with aqueous potassium permanganate solution to yield the corresponding acids having acid numbers equal to the theoretical alkylbenzoic acid and alkyltoluic acid derived from such aldehydes.

Nitromethane condenses with the aldehyde derivatives prepared as indicated above to yield the nitroalcohols corresponding to the following structural formulae and in accordance with the following equations, the resulting nitroalcohols undergoing dehydration during distillation thereof or in the presence of a chemical dehydrating agent such as phosphorous pentoxide, potassium carbonate, etc. to form the corresponding nitro-vinyl derivatives, also in accordance with the following equation, wherein $n$ is equal to 0 for the benzene series and 1 for the toluene series:

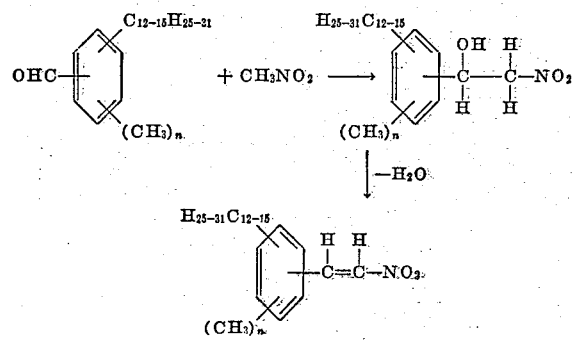

These condensations may be readily effected by reacting nitromethane with the previously formed aldehyde in an aldol-type condensation reaction, dehydration to the nitrovinyl derivating being effected merely by heating the nitroalcohol, for example, by distilling the intermediate alcohol in the purification of the product or by heating the nitroalcohol with a sufficient quantity of phosphorous pentoxide to convert the theoretical quantity of water of dehydration to phosphoric acid. The aldol condensation of the initial aldehyde product with nitromethane proceeds readily with substantially quantitative yields in the presence of caustic soda (10 cc. of 30% caustic, per mole of aldehyde) at 40° C., accompanied by stirring, the caustic being added to the stirred mixture of nitromethane and aldehyde. Following the condensation, the product, dissolved in an equal volume of ether, is washed with water to remove water-soluble catalyst and by-products, the ether solution dried and evaporated, and the hydroxy-nitroethyl-substituted alkyl aromatic derivative purified by distillation. During the distillation at 3 mm. Hg pressure, the product undergoes dehydration to form the nitrovinyl-alkyl aromatic product resulting from the dehydro-condensation of the nitrohydroxy ethyl radical. A bromine number test on the product, as compared to the alkyl aromatic hydrocarbon starting material, indicates that the nitro-vinyl derivative absorbs the theoretical quantity of bromine corresponding to a mono-olefinic side chain.

The nitro-vinyl-substituted alkyl aromatic hydrocarbon is converted to the corresponding nitroethyl sulfonate derivative by condensing the nitro-vinyl intermediate with sodium bisulfite. For this purpose 2 moles of sodium bisulfite in concentrated aqueous solution is stirred with the nitro-vinyl derivative and heated to a temperature of 80° C. for three hours. Evaporation of the reaction mixture yields a dried residue comprising the desired sodium sulfonate derivative. The product in each case, that is, both the benzene and toluene derivatives, have surface active properties. When tested for detergency in accordance with the standard Launder-O-Meter procedure, utilizing a 0.3% aqueous solution of the respective products and a 0.3% aqueous solution of sodium dodecylbenzene sulfonate as a basis of comparison, under otherwise similar test conditions, the sodium dodecylbenzene-nitroethyl sulfonate has a detergency of 121% of sodium dodecylbenzene sulfonate, while the sodium dodecyltoluene-nitroethyl sulfonate has a detergency of 118% that of sodium dodecylbenzene sulfonate.

The nitroethyl sulfonate products prepared as indicated above may be hydrogenated by reacting the same with hydrogen at 20 atmospheres' pressure in an autoclave and in the presence of 0.1% of a kieselguhr-supported nickel hydrogenation catalyst at 70° C. Substantially quantitative conversion of the nitro group to an amino radical is obtained in the above conversion as indicated by the fact that the product dissolves completely in 2 N hydrochloric acid and is precipitated again as the hydrochloride salt by saturating the solution with hydrogen chloride.

The hydrochloride salt as prepared above is converted again to the amine sulfonate by neutralizing an aqueous solution of the hydrochloride salt to a pH of 7 with an aqueous caustic soda solution, the amine sulfonate separating as a salt by saturating the solution with sodium sulfate.

A detergent product having soap-like characteristics, in that it exists at normal temperatures in the form of a waxlike material which dissolves readily in water to produce an aqueous solution having mucilaginous properties, is formed by condensing the amine sulfonate, prepared as indicated above, with ethylene oxide, the condensation being effected by charging the amine sulfonate and the desired molar ratio of ethylene oxide into a pressure autoclave with about 1% by weight of pyridine as catalyst, based upon the weight of amine sulfonate charged and maintaining the reaction mixture at a temperature of about 70° C. for 3 hours. The autoclave is rotated during the course of the reaction. In the following runs, 2, 6, 10, 12, 18 and 22 moles of ethylene oxide per mole of amine sulfonate are reacted at the above reaction conditions, utilizing both the dodecylbenzene derivative and the dodecyltoluene derivative in separate runs.

The products when tested for detergency by comparison with sodium dodecylbenzene sulfonate at equal concentrations and under similar test conditions, indicate that the detergencies of the products increase as the chain length of the poly-(oxyethylene) chain increases, up to a total of 12 oxyethylene units per molecule, the product of maximum detergent effectiveness being the dodecylbenzene-derived product which has a detergency equal to 142% of dodecylbenzene sulfonate. As the number of oxyethylene units, per molecule in the product increases, the resulting product becomes a harder wax-like material of higher softening point and greater water-solubility. The products containing a total of 2 and 6 oxyethylene units per molecule are semi-crystalline in character and are more highly effective as detergents than the product containing no oxyethylene chain. The products containing more than 10 oxyethylene units per molecule, although of lesser effectiveness as detergents than the product containing 10 units, are nevertheless highly effective wetting agents.

*Example II*

A diamylnaphthalene alkylate prepared by alkylating naphthalene with pentene-1 is condensed with formaldehyde in the presence of hydrogen chloride by a procedure substantially similar to the reaction described in Example I, above. The resulting aldehyde is further condensed with nitromethane and the resulting nitroethyl-diamylnaphthalene converted to the corresponding nitro-vinyl-substituted diamylnaphthalene by heating to a temperature of 125° C. As in the procedure of Example I, above, the nitro-vinyl intermediate product condenses with sodium bisulfite to form the sodium diamylnaphthalene-nitroethyl sulfonate salt which may similarly be reduced to the amine corresponding to the reduced nitro group of the preceding product. The nitroethyl intermediate product is a wetting agent, although substantially ineffective as a detergent for cotton muslin. Its effectiveness as a detergent, however, may be increased by condensing the amine sulfonate intermediate formed by hydrogen-reduction of the nitroethyl sulfonate intermediate with an alkylene oxide to thereby increase the size of the hydrophilic group in the resultant product. For this purpose, the amine sulfonate intermediate separated from the product of the hydrogenation reaction is condensed with glycidol

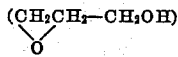

in the presence of a basic condensation catalyst, which in this preparation is pyridine, present in the reaction mixture to the extent of 2% by weight of the amine sulfonate charged thereto. The reaction is carried out by charging different proportions of glycidol to amine sulfonate in order to determine the optimum chain length of the resulting hydrophilic groups having the structure:

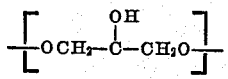

attached to the amino nitrogen atom. In the series of products prepared by this procedure 1, 2, 3 and 4 molar proportions of glycidol per mole of amine sulfonate are charged into a rotating pressure autoclave, with the pyridine catalyst, and the reaction mixture maintained at 80° C. for 3 hours as the autoclave is slowly rotated to mix the reactants. The products tend to acquire more wax-like properties and greater water-solubility as the number of hydrophilic units in the poly glycidol chain increase, the products of the condensation reaction yielding clear aqueous solutions as the number of glycidol units in the chain increases. The product of maximum detergency (128% of dodecylbenzene sulfonate) contains approximately 4 glycidol monomer units per molecule, as indicated by cryoscopic molecular weight determinations.

I claim as my invention:

1. A compound having the structural formula

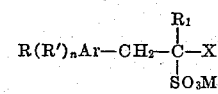

wherein Ar is a polyvalent aromatic hydrocarbon radical selected from the mono- and dinuclear aromatic hydrocarbons, R is an alkyl group containing from 5 to about 9 carbon atoms when Ar is bicyclic and from 8 to about 18 carbon atoms when Ar is monocyclic, R' is a short chain alkyl group containing from 1 to 2 carbon atoms per group, n is a small whole number having a value of from 0 to 2, $R_1$ is a radical selected from the group consisting of hydrogen and alkyl containing from 1 to 4 carbon atoms, X is a radical selected from the group consisting of nitro, amino, ω-hydroxy-(alkylene-oxy)-amino, containing from 1 to about 20 oxyalkylene units per radical of which the alkylene group contains from 2 to 3 carbon atoms, and alkyl amino containing from 1 to 6 carbon atoms per alkyl group, and M is an electro-positive ion selected from the group consisting of hydrogen, alkali metal, and ammonium radicals.

2. A dodecylphenyl nitroethyl sulfonate.
3. A dodecyltolyl nitroethyl sulfonate.
4. Diamylnaphthyl nitroethyl sulfonate.
5. A compound having the structural formula

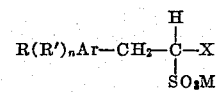

wherein Ar is a monocyclic aromatic hydrocarbon radical, R is an alkyl group of from about 9 to about 15 carbon atoms, R' is an alkyl group of from 1 to 2 carbon atoms, n is a whole number having a value of from 0 to 2, M is an alkali metal, and X is a radical selected from the group consisting of nitro, amino, ω-hydroxy-(alkylene-oxy)-amino, containing from 1 to about 20 oxyalkylene units per radical of which the alkylene group contains from 2 to 3 carbon atoms, and alkyl amino containing from 1 to 6 carbon atoms per alkyl group.

6. A compound as defined in claim 5 further characterized in that X is nitro.
7. An alkyl phenyl nitroethyl sulfonate having from about 9 to about 15 carbon atoms in the alkyl group.
8. An alkyl tolyl nitroethyl sulfonate having from about 9 to about 15 carbon atoms in the alkyl group.
9. An alkyl aryl nitroethyl sulfonate having not more than 2 hydrocarbon rings in the aryl radical and having from 5 to about 15 carbon atoms in the alkyl group.
10. Sodium dodecylbenzene-nitroethyl sulfonate.
11. Sodium dodecyltoluene-nitroethyl sulfonate.
12. Sodium diamylnaphthalene-nitroethyl sulfonate.

References Cited in the file of this patent

UNITED STATES PATENTS

| | | |
|---|---|---|
| 2,103,880 | Ufer | Dec. 28, 1937 |
| 2,198,249 | Henke et al. | Apr. 23, 1940 |

OTHER REFERENCES

Fieser and Fieser: Organic Chemistry, pp. 56, 230, 732 (1950).

Groggins: Unit Processes in Organic Synthesis, p. 555 (1952).